(12) United States Patent
Cho

(10) Patent No.: US 11,836,370 B2
(45) Date of Patent: Dec. 5, 2023

(54) STORAGE DEVICE AND OPERATING METHOD THEREOF

(71) Applicant: SK hynix Inc., Icheon-si (KR)

(72) Inventor: Hung Yung Cho, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/449,921

(22) Filed: Oct. 4, 2021

(65) Prior Publication Data
US 2022/0334746 A1 Oct. 20, 2022

(30) Foreign Application Priority Data
Apr. 14, 2021 (KR) .................. 10-2021-0048639

(51) Int. Cl.
*G06F 3/00* (2006.01)
*G06F 3/06* (2006.01)

(52) U.S. Cl.
CPC .......... *G06F 3/0644* (2013.01); *G06F 3/0604* (2013.01); *G06F 3/0629* (2013.01); *G06F 3/0673* (2013.01)

(58) Field of Classification Search
None
See application file for complete search history.

(56) References Cited

U.S. PATENT DOCUMENTS

2020/0167274 A1    5/2020   Bahirat et al.
2022/0244869 A1*   8/2022   Kanteti ................. G06F 3/0679

FOREIGN PATENT DOCUMENTS

CN           112083879 A    * 12/2020
KR        10-2020-0092414      8/2020
WO       WO-2020193754 A1  * 10/2020  ......... H04L 49/9005

OTHER PUBLICATIONS

A Physical Partition Isolation And Hiding Method Of Solid Hard Disk Storage Space [CN 112083879 A]; Dec. 15, 2020; English translation.*

* cited by examiner

*Primary Examiner* — Midys Rojas
(74) *Attorney, Agent, or Firm* — Weaver Austin Villeneuve & Sampson LLP

(57) ABSTRACT

A storage device includes: a memory device including a plurality of memory blocks organized into a plurality of zones; and a memory controller configured to perform a write operation on the plurality of zones. The memory controller is operable to divide at least one zone among the plurality of zones into subzones when the memory controller receives data corresponding to consecutive logical addresses provided from a host, and control the memory device to store the data in at least one subzone among the subzones. The at least one zone can be divided based on a characteristic of the memory device and a size of the data.

16 Claims, 12 Drawing Sheets

STORAGE DEVICE AND OPERATING METHOD THEREOF

CROSS-REFERENCE TO RELATED APPLICATION

The present application claims priority under 35 U.S.C. § 119(a) to Korean patent application number 10-2021-0048639 filed on Apr. 14, 2021, in the Korean Intellectual Property Office, the entire disclosure of which is incorporated by reference herein.

BACKGROUND

1. Technical Field

The present disclosure generally relates to an electronic device, and more particularly, to a storage device and an operating method thereof.

2. Related Art

A storage device is a device which stores data under the control of a host device such as a computer or a smart phone. The storage device may include a memory device for storing data and a memory controller for controlling the memory device. The memory device can be classified into a volatile memory device or a nonvolatile memory device.

The volatile memory device is a memory device in which data is stored when power is supplied, and the stored data disappears when the supply of power is interrupted. Examples of a volatile memory device may include a Static Random Access Memory (SRAM), a Dynamic Random Access Memory (DRAM), and the like.

The nonvolatile memory device is a memory device in which data does not disappear even when the supply of power is interrupted. Examples of a nonvolatile memory device may include a Read Only Memory (ROM), a Programmable ROM (PROM), an Electrically Programmable ROM (EPROM), an Electrically Erasable ROM (EEROM), a flash memory, and the like.

SUMMARY

Embodiments provide a storage device to which a zoned-namespace system for efficiently using a zone (e.g., having a fixed size) is applied, and an operating method of the storage device.

In accordance with an aspect of the present disclosure, there is provided a storage device including: a memory device including a plurality of memory blocks organized into a plurality of zones; and a memory controller configured to perform a write operation on the plurality of zones, wherein the memory controller is operable to divide at least one zone among the plurality of zones into subzones when the memory controller receives data corresponding to consecutive logical addresses provided from a host, and control the memory device to store the data in at least one subzone among the subzones. The at least one zone can be divided based on a characteristic of the memory device and a size of the data.

In accordance with another aspect of the present disclosure, there is provided a method for operating a storage device to which a zoned-namespace is applied, the method including: receiving data corresponding to consecutive logical addresses provided from a host; dividing at least one zone including a plurality of memory blocks into subzones, based on a characteristic of a memory device and a size of the data; and storing the data in at least one subzone among the subzones.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 5 is a diagram illustrating a super block and a zone in accordance with an embodiment of the present disclosure.

FIG. 6 is a diagram illustrating a subzone in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and should not be construed as limited to the embodiments set forth herein.

The present disclosure may apply various changes and different shape, therefore only illustrate in details with particular examples. However, the examples do not limit to certain shapes but apply to all the change and equivalent material and replacement. The drawings included are illustrated a fashion where the figures are expanded for the better understanding. In describing the embodiments, description of technologies that are known in the art and are not directly related to the present disclosure may be omitted. This is to further clarify the gist of the present disclosure without clutter.

Hereinafter, exemplary embodiments of the present disclosure will be described in detail with reference to the accompanying drawings in order for those skilled in the art to be able to readily implement the technical spirit of the present disclosure.

Figure 1:
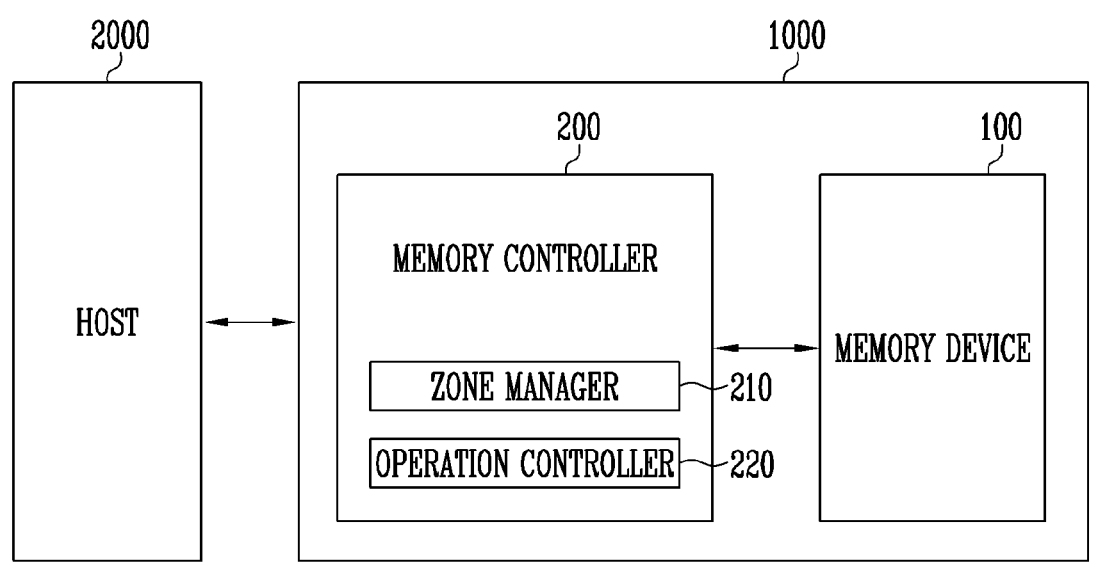
FIG. 1 is a block diagram illustrating a storage device in accordance with an embodiment of the present disclosure.

FIG. 1 is a block diagram illustrating a storage device in accordance with an embodiment of the present disclosure.

Referring to FIG. 1, the storage device 1000 may include a memory device 100, and a memory controller 200.

The storage device 1000 may be a device for storing data under the control of a host 2000, such as a mobile phone, a smart phone, an MP3 player, a laptop computer, a desktop computer, a game console, a display device, a tablet PC, or an in-vehicle infotainment, etc.

The storage device 1000 may be manufactured as any one of various types of storage devices according to a host interface implementing a communication scheme with the host 2000. For example, the storage device 1000 may be implemented with any one of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 1000 may be implemented as any one of various kinds of package types. For example, the storage device 1000 may be implemented as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP), etc.

The memory device 100 may store data or use stored data. The memory device 100 operates under the control of the memory controller 200. Also, the memory device 100 may include a plurality of memory dies, and each of the plurality of memory dies may include a memory cell array including a plurality of memory cells for storing data.

Each of the memory cells may be configured as a Single Level Cell (SLC) storing one data bit, a Multi-Level Cell (MLC) storing two data bits, a Triple Level Cell (TLC) storing three data bits, or a Quad Level Cell (QLC) storing four data bits, etc.

The memory cell array may include a plurality of memory blocks. Each memory block may include a plurality of memory cells, and one memory block may include a plurality of pages. The page may be a unit (a granularity) for storing data in the memory device 100 or reading data stored in the memory device 100.

The memory device 100 may be implemented using one or more of a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is assumed and described.

The memory device 100 may receive a command and an address from the memory controller 200. The command can be implemented using a signal or a combination of signals. The memory device 100 may access an area selected by the received address in the memory cell array. That the memory device 100 accesses the selected area may mean that the memory device 100 performs an operation corresponding to the received command on the selected area. For example, the memory device 100 may perform a write operation (program operation), a read operation, and an erase operation. The program operation may be an operation in which the memory device 100 records data in the area selected by the address. The read operation may mean an operation in which the memory device 100 reads data from the area selected by the address. The erase operation may mean an operation in which the memory device 100 erases data stored in the area selected by the address.

The memory controller 200 may control overall operations of the storage device 1000.

When power is applied to the storage device 1000, the memory controller 200 may execute firmware (FW). The FW may include a Host Interface Layer (HIL) which receives a request input from the host 2000 or outputs a response to the host 2000, a Flash Translation Layer (FTL) which manages an operation between an interface of the host 2000 and an interface of the memory device 100, and/or a Flash Interface Layer (FIL) which provides a command to the memory device 100 or receives a response from the memory device 100.

The memory controller 200 may receive data and a Logical Address (LA) from the host 2000, and translate the LA into a Physical Address (PA) representing an address of memory cells in which data included in the memory device 100 is to be stored. The LA may include a Logical Block Address (LBA), and the PA may include a Physical Block Address (PBA).

The memory controller 200 may control the memory device 100 to perform a program operation, a read operation, an erase operation, or the like in response to a request from the host 2000. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

The memory controller 200 may control the memory device 100 to autonomously perform a program operation, a read operation, or an erase operation regardless of any requests from the host 2000. For example, the memory controller 200 may control the memory device 100 without specific commands from the host 2000 to perform a program operation, a read operation, or an erase operation, which is used to perform a background operation such as wear leveling, garbage collection, or read reclaim, etc.

In accordance with an embodiment of the present disclosure, when the memory controller 200 receives data corresponding to consecutive logical addresses provided from the host 2000, the memory controller 200 may divide at least one zone among a plurality of zones into subzones, based on one or more characteristics of the memory device 100 and a size of the data, and control the memory device 100 to store the received data in at least one subzone among the subzones. The one or more characteristics of the memory device 100 may include at least one of a number of planes on which an interleaving operation can be performed, a number of channels included in the memory device 100, and a number of dies connected to the channel, etc.

Also, in accordance with an embodiment of the present disclosure, the memory controller 200 may include a zone manager 210 and an operation controller 220.

In an embodiment, the zone manager 210 may determine a division method including a size of each of the subzones and a division number (e.g., the number of subzones). In an embodiment, the zone manager 210 may determine the size of each of the subzones to be an n times (n is a positive integer) the size of a die. For example, the zone manager 210 may determine the subzone to be one time, two times, four times, eight times, or the like.

In an embodiment, the zone manager 210 may divide one zone into subzones including different sizes. For example, the zone manager 210 may divide one zone into a subzone which is one times the size of the die, a subzone which is two times the size of the die, and/or a subzone which is four times the size of the die, etc.

In an embodiment, the operation controller 220 may control the memory device 100 such that an internal operation of the memory device 100 is performed in a unit (a granularity) of at least one subzone. The internal operation may include at least one of a program operation, a read operation, an erase operation, and a background operation on a plurality of memory blocks.

In an embodiment, when the memory controller 200 receives the same logical address as the logical address from the host 2000, the memory controller 200 may erase a subzone corresponding to the logical address, and store data corresponding to the same logical address in the erased subzone.

The host 2000 may communicate with the storage device 1000, using at least one of various communication manners, such as a Universal Serial bus (USB), a Serial AT Attachment (SATA), a Serial Attached SCSI (SAS, a High Speed InterChip (HSIC), a Small Computer System Interface (SCSI), a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM), etc.

Figure 2:
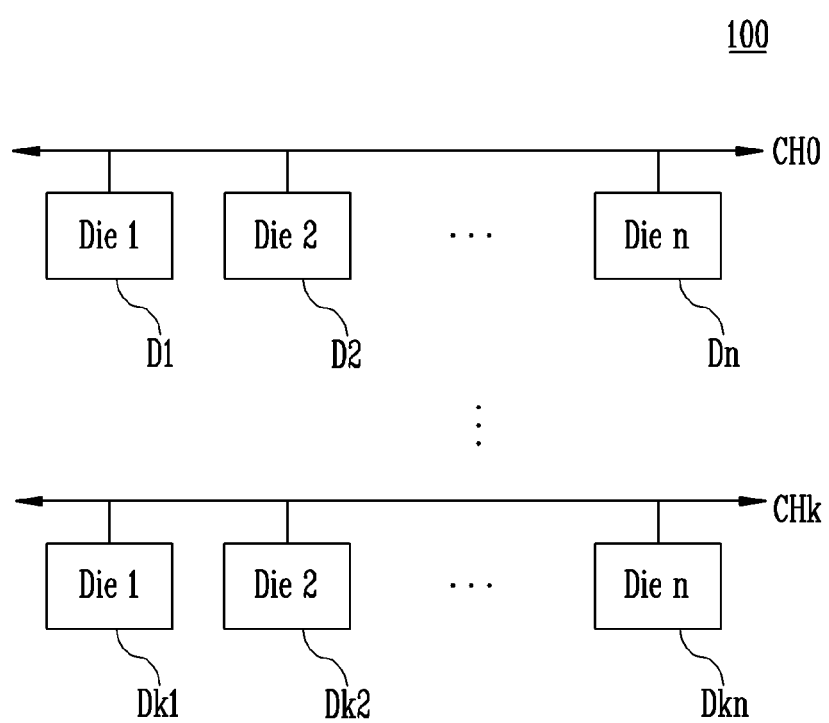
FIG. 2 is a block diagram illustrating a memory device in accordance with an embodiment of the present disclosure.

FIG. 2 is a block diagram illustrating a memory device in accordance with an embodiment of the present disclosure.

Referring to FIG. 2, the memory device 100 may include a plurality of channels CH0 to CHk and a plurality of dies D1 to Dkn connected to the plurality of channels CH0 to CHk. In addition, the memory controller 2000 may be connected to the memory device 100 by using the plurality of channels CH0 to CHk. Specifically, the memory controller 200 may be connected to the plurality of channels CH0 to CHk, and be connected to a plurality of dies D1 to Dn connected to a zeroth channel CH0, etc. That is, the memory controller 200 may communicate with the plurality of dies D1 to Dkn by using the plurality of channels CH0 to CHk.

The memory controller 200 may control the plurality of dies D1 to Dn to operate independently from each other. For example, a first die D1 connected to the zeroth channel CH0 and a first die Dk1 connected to a kth channel CHk have circuits or structures for performing an internal operation, which may be independent from each other. Therefore, the memory controller 200 may control the memory device 100 such that the first die D1 connected to the zeroth channel CH0 and the first die Dk1 connected to the kth channel CHk operate independently from each other. Also, the memory controller 200 may also control the memory device 100 such that the dies D1 to Dn connected to the same channel (e.g., the zeroth channel CH0) operate at the same time.

Figure 3:
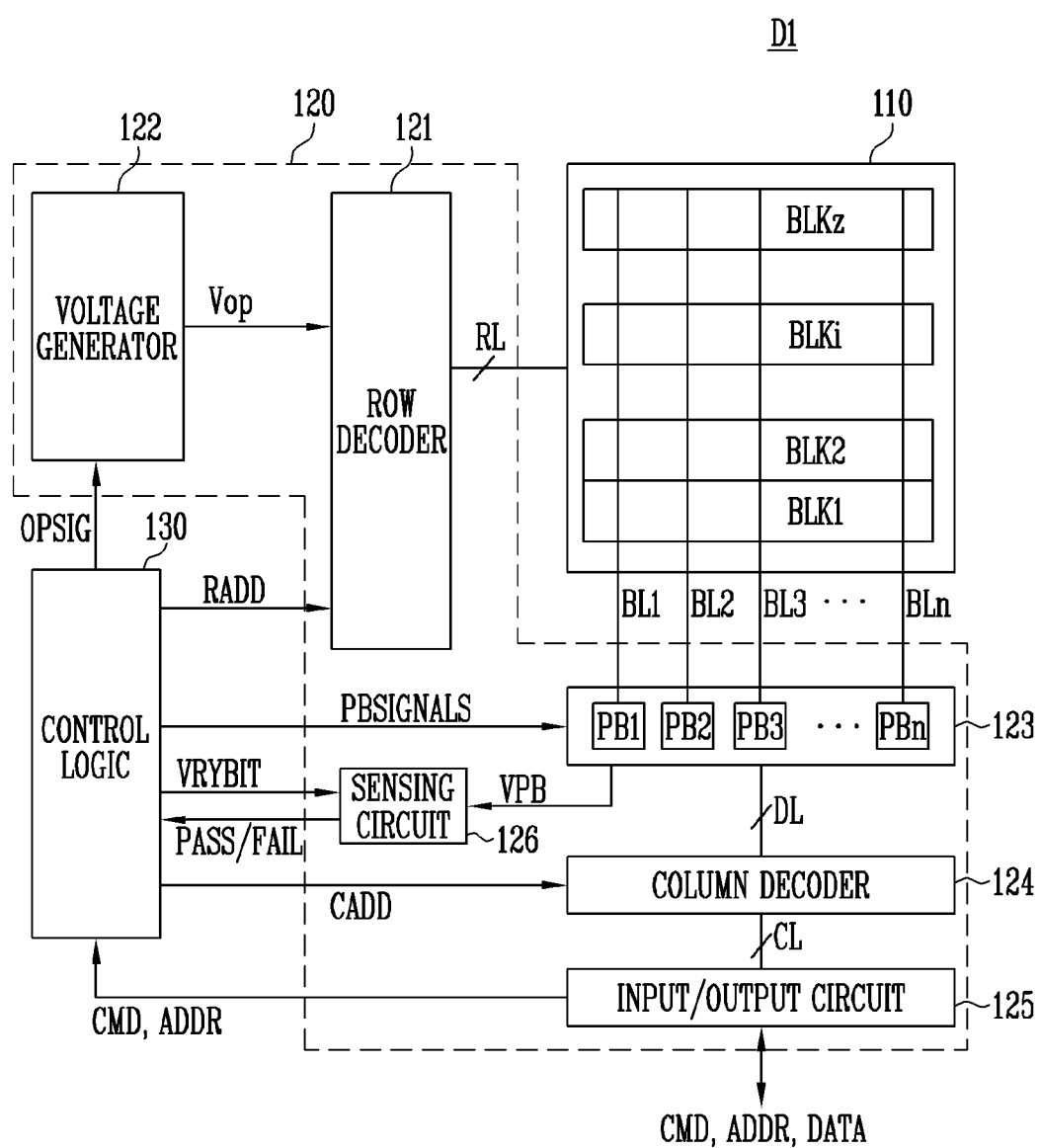
FIG. 3 is a diagram illustrating a die in accordance with an embodiment of the present disclosure.

FIG. 3 is a diagram illustrating a die in accordance with an embodiment of the present disclosure. The plurality of dies D1 to Dkn shown in FIG. 2 may be configured identical to one another (or can be different), and therefore, the first die D1 connected to the zeroth channel among the plurality of dies D1 to Dkn will be described as an example.

Referring to FIG. 3, the first die D1 may include a memory cell array 110, a peripheral circuit 120, and a control logic 130.

The memory cell array 110 includes a plurality of memory blocks BLK1 to BLKz. The plurality of memory blocks BLK1 to BLKz are connected to a row decoder 121 through row lines RL. The row lines RL may include at least one source select line, a plurality of word lines, and at least one drain select line. The plurality of memory blocks BLK1 to BLKz are connected to a page buffer group 123 through bit lines BL1 to BLn. Each of the plurality of memory blocks BLK1 to BLKz includes a plurality of memory cells. In an embodiment, the plurality of memory cells may be nonvolatile memory cells. Memory cells connected to the same word line may be defined as one page. Therefore, one memory block may include a plurality of pages.

Each of the memory cells included in the memory cell array 110 may be configured as a Single Level Cell (SLC) storing one data bit, a Multi-Level Cell (MLC) storing two data bits, a Triple Level Cell (TLC) storing three data bits, or a Quadruple Level Cell (QLC) storing four data bits, etc.

The peripheral circuit 120 may be configured to perform a program operation, a read operation or an erase operation on a selected area of the memory cell array 110 under the control of the control logic 130. That is, the peripheral circuit 120 may drive the memory cell array 110 under the control of the control logic 130. For example, the peripheral circuit 120 may apply various operating voltages to the row lines RL and the bit lines BL1 to BLn, or discharge the applied voltages under the control of the control logic 130.

Specifically, the peripheral circuit 120 may include the row decoder 121, a voltage generator 122, the page buffer group 123, a column decoder 124, an input/output circuit 125, and a sensing circuit 126.

The row decoder 121 may be connected to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 may operate under the control of the control logic 130. The row decoder 121 may receive a row address RADD from the control logic 130. Specifically, the row decoder 121 may decode the row address RADD. The row decoder 121 may select at least one memory block among the memory blocks BLK1 to BLKz according to the decoded address. Also, the row decoder 121 may select at least one word line of the selected memory block to apply voltages generated by the voltage generator 122 to the at least one word line WL according the decoded address.

For example, in a program operation, the row decoder 121 may apply a program voltage to the selected word line, and apply a program pass voltage that is different (e.g., lower) than that of the program voltage to unselected word lines. In a program verify operation, the row decoder 121 may apply a verify voltage to the selected word line, and apply a verify pass voltage that is different (e.g., higher) than the verify voltage to the unselected word lines. In a read operation, the row decoder 121 may apply a read voltage to the selected word line, and apply a read pass voltage that is different (e.g., higher) than the read voltage to the unselected word lines.

In an embodiment, an erase operation of the memory device 100 may be performed in a memory block unit. In the erase operation, the row decoder 121 may select one memory block according to the decoded address. In the erase operation, the row decoder 121 may apply a certain voltage (e.g., a ground voltage) to word lines connected to the selected memory block.

The voltage generator 122 may operate under the control of the control logic 130. Specifically, the voltage generator 122 may generate a plurality of voltages by using an external power voltage supplied to the memory device 100 under the control of the control logic 130. For example, the voltage generator 122 may generate a program voltage, a verify voltage, a pass voltage, a read voltage, an erased voltage, and the like under the control of the control logic 130. That is, the voltage generator 122 may generate various operating voltages Vop used in program, read, and erase operations in response to an operation signal OPSIG.

In an embodiment, the voltage generator 122 may generate an internal power voltage by regulating the external power voltage. The internal power voltage generated by the voltage generator 122 may be used as an operation voltage of the memory cell array 110.

In an embodiment, the voltage generator 122 may generate a plurality of voltages by using the external power voltage or the internal power voltage. For example, the voltage generator 122 may include a plurality of pumping capacitors for receiving the internal power voltage, and generate the plurality of voltages by selectively activating the plurality of pumping capacitors under the control of the control logic 130. In addition, one or more of generated voltages may be supplied to the memory cell array 110 by the row decoder 121.

The page buffer group 123 may include first to nth page buffers PB1 to PBn. The first to nth page buffers PB1 to PBn may be connected to the memory cell array 110 respectively through first to nth bit lines BL1 to BLn. Also, the first to nth bit lines BL1 to BLn may operate under the control of the control logic 130. Specifically, the first to nth bit lines BL1 to BLn may operate in response to page buffer control signals PBSIGNALS. For example, the first to nth page buffers PB1 to PBn may temporarily store data received through the first to nth bit lines BL1 to BLn, or sense a voltage or current of the bit lines BL1 to BLn in a read or verify operation.

Specifically, in a program operation, the first to nth page buffers PB1 to PBn may transfer data DATA received through the input/output circuit 125 to selected memory cells through the first to nth bit lines BL1 to BLn, when a program voltage is applied to a selected word line. Memory cells of a selected page may be programmed according to the transferred data DATA. A memory cell connected to a bit line to which a program allow voltage (e.g., a ground voltage) is applied may have an increased threshold voltage. A threshold voltage of a memory cell connected to a bit line to which a program inhibit voltage (e.g., a power voltage) is applied may be maintained.

In a program verify operation, the first to nth page buffers PB1 to PBn may read page data from the selected memory cells through the first to nth bit lines BL1 to BLn.

In a read operation, the first to nth page buffers PB1 to PBn may read data DATA from the memory cells of the selected page through the first to nth bit lines BL1 to BLn, and outputs the read data DATA to the input/output circuit 125 under the control of the column decoder 124.

In an erase operation, the first to nth page buffers PB1 to PBn may float the first to nth bit lines BL1 to BLn.

The column decoder 124 may communicate data between the input/output circuit 125 and the page buffer group 123 in response to a column address CADD. For example the column decoder 124 may communicate data with the first to nth page buffers PB1 to PBn through data lines DL, or communicate data with the input/output circuit 125 through column lines CL.

The input/output circuit 125 may transfer a command CMD and an address ADDR, which are received from the memory controller 200, to the control logic 130, or exchange data DATA with the column decoder 124.

In a read operation or verify operation, the sensing circuit 126 may generate a reference current in response to an allow bit VRYBIT signal, and output a pass or fail PASS/FAIL signal by comparing a sensing voltage VPB received from the page buffer group 123 and a reference voltage generated by the reference current.

The control logic 130 may control the peripheral circuit 120 by outputting the operation signal OPSIG, the row address RADD, the page buffer control signals PBSIGNALS, and the allow bit VRYBIT in response to the command CMD and the address ADDR.

Also, the control logic 130 may determine whether the verify operation has passed or failed in response to the pass or fail PASS/FAIL signal. Also, the control logic 130 may control the page buffer group 123 to temporarily store verify information including the pass or fail PASS/FAIL signal in the page buffer group 123. Specifically, the control logic 130 may determine a program state of a memory cell in response to the pass or fail PASS/FAIL signal. For example, when the memory cell operates as a Triple Level Cell (TLC), the control logic 130 may determine whether the program state of the memory cell is an erase state E or any one of first to seventh program states P1 to P7.

Figure 4:
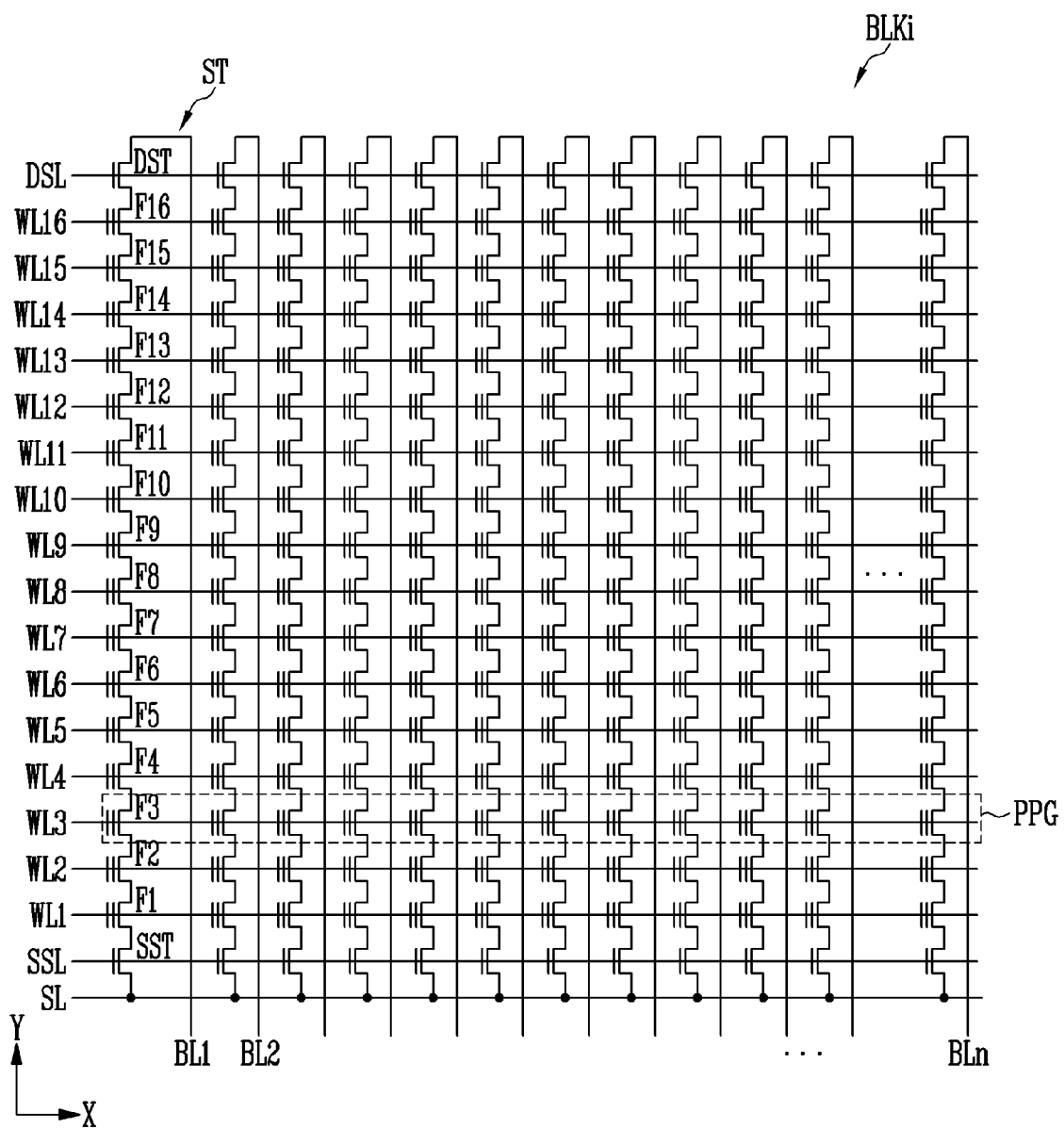
FIG. 4 is a diagram illustrating a memory block in accordance with an embodiment of the present disclosure.

FIG. 4 is a diagram illustrating a memory block in accordance with an embodiment of the present disclosure.

Referring to FIG. 4, in the memory block BLKi, a plurality of word lines arranged in parallel to each other may be connected between a first select line and a second select line. The first select line may be a source select line SSL, and the second select line may be a drain select line DSL. More specifically, the memory block BLKi may include a plurality of strings ST connected between bit lines BL1 to BLn and a source line SL. The bit lines BL1 to BLn may be respectively connected to the strings ST, and the source line SL may be commonly connected to the strings ST. The strings ST may be configured identically to one another, and therefore, a string ST connected to a first bit line BL1 will be described in detail as an example.

The string ST may include a source select transistor SST, a plurality of memory cells F1 to F16, and a drain select transistor DST, which are connected in series to each other between the source line SL and the first bit line BL1. At least one source select transistor SST and at least one drain select transistor DST may be included in one string ST, and memory cells of which number is greater than that of the memory cells F1 to F16 shown in the drawing may be included in the one string ST.

A source of the source select transistor SST may be connected to the source line SL, and a drain of the drain select transistor DST may be connected to the first bit line BL1. The memory cells F1 to F16 may be connected in series between the source select transistor SST and the drain select transistor DST. Gates of source select transistors SST included in different strings ST may be connected to the source select line SSL, and gates of drain select transistors DST included in different strings ST may be connected to the drain select line DSL. Gates of the memory cells F1 to F16 may be connected to a plurality of word lines WL1 to WL16. A group of memory cells connected to the same word line among memory cells included in different strings ST may be referred to as a physical page PPG. Therefore, physical pages PPG corresponding to the number of the word lines WL1 to WL16 may be included in the memory block BLKi.

Each of the memory cells may be configured as a Single Level Cell (SLC) storing one data bit, a Multi-Level Cell (MLC) storing two data bits, a Triple Level Cell (TLC) storing three data bits, or a Quad Level Cell (QLC) storing four data bits, etc.

The SLC may store one-bit data. One physical page PG of the SLC may store one logical page (LPG) data. The one LPG data may include data bits of which number corresponding to that of cells included in the one physical page PG.

The MLC, the TLC, and the QLC may store two or more-bit data. One physical page PG may store two or more LPG data.

Figure 5:
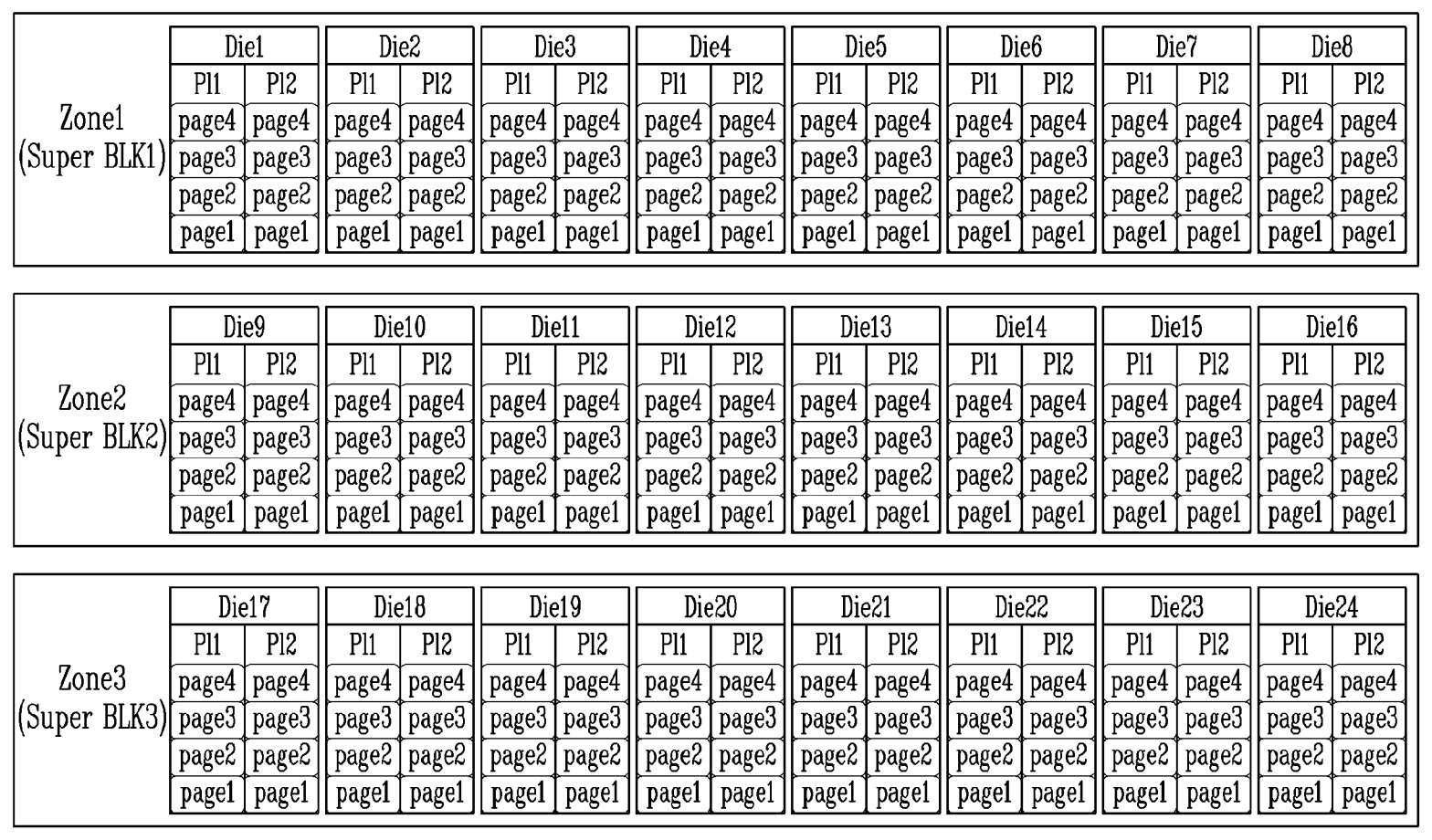

FIG. 5 is a diagram illustrating a super block and a zone in accordance with an embodiment of the present disclosure.

Referring to FIG. 5, the memory device 100 may include first to twenty-fourth dies, and each die may include planes PL1 and PL2 each including a plurality of pages. Although a case where the memory device 100 includes 24 dies and each die includes two planes PL1 and PL2 has been illustrated in FIG. 5, it will be apparent that the memory device 100 may be implemented in a form including dies or planes of which number is greater or smaller than that of dies or planes included in the form shown in FIG. 5.

A plurality of pages may be grouped as a super block Super Block. The super block Super Block may be a set of memory blocks BLK on which a read operation, a write operation, or the like is performed at the same time or at the same zone, or a set of memory blocks BLK on which a read operation, a write operation, or the like is performed in association therewith or in relation thereto. Alternatively or additionally, the super block Super Block may be a set of memory blocks BLK on which a read operation, a write operation, or the like is performed with respect to one command, or a set of memory blocks BLK on which a read operation, a write operation, or the like is performed in associated therewith or at the same time in the memory device 100. In addition, a group of memory blocks BLK distinguished from each other from the viewpoint of an operation among a plurality of memory blocks BLK may be referred to as a super block Super Block.

In addition, the memory device can be organized into multiple zones. For example, super blocks Super Block may respectively correspond to zones. Specifically, first to third zones Zone1 to Zone3 may respectively correspond to first to third super blocks Super BLK1 to Super BLK3. In addition, the zone may be a storage area corresponding to a logical address group configured with logical addresses. Specifically, a plurality of zones may be areas for storing data corresponding to logical address groups corresponding thereto, respectively. For example, the first zone Zone1 may be an area for storing data corresponding to a first logical address group Logical Address Group 1. In addition, the second zone Zone2 may be an area for storing data corresponding to a second logical address group Logical Address Group 2. In addition, the third zone Zone3 may be an area for storing data corresponding to a third logical address group Logical Address Group 3. The logical address groups may include consecutive logical addresses.

In accordance with an embodiment, the size of the super block Super Block may be changed according to the memory device 100. Also, in accordance with an embodiment, a plurality of memory blocks included in the super block Super Block may be located in two or more different dies Die. For example, the first super block Super BLK1 may include memory blocks or pages included in the first to eighth dies Die1 to Die8, and the second super block Super BLK2 may include memory blocks included in the ninth to sixteenth dies Die9 to Die16. In addition, the third super block Super BLK3 may include memory blocks included in the seventeenth to twenty-fourth dies Die17 to Die24. In addition, each of a plurality of memory blocks included in one super block Super Block may include a plurality of pages. The plurality of pages may constitute a plurality of page rows Page Row according to a row order. One page row may be configured with several pages. Although each of the planes shown in FIG. 5 is illustrated in a form including first to fourth pages page1 to page4, this is merely an example, and each plane may include pages of which number is greater or fewer than that shown in FIG. 5.

Figure 6:
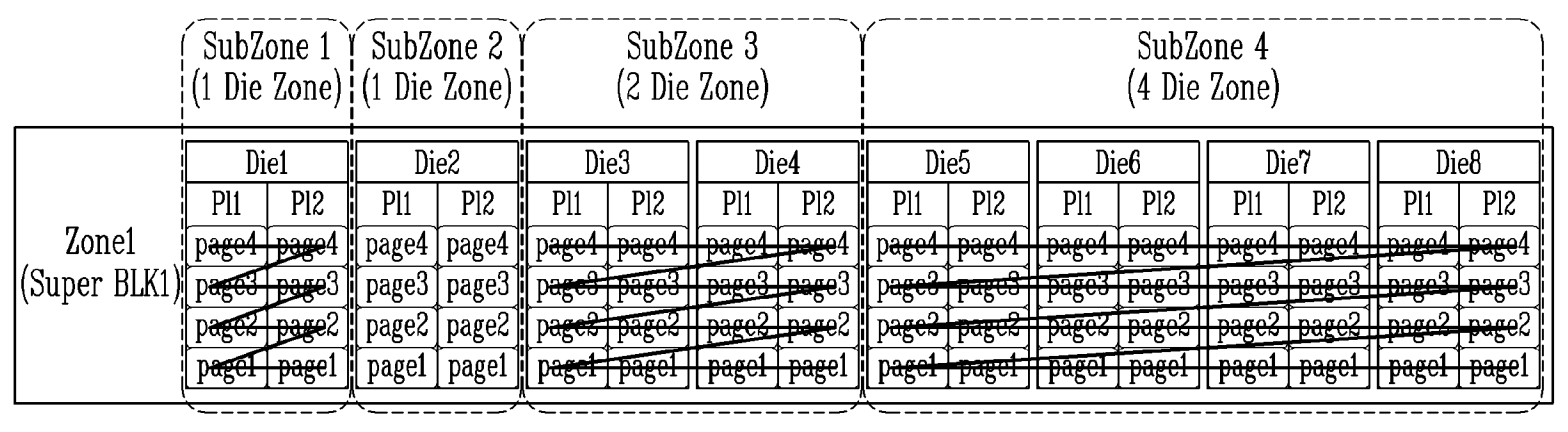

FIG. 6 is a diagram illustrating a subzone in accordance with an embodiment of the present disclosure.

Referring to FIG. 6, one zone may include a plurality of subzones SubZone. For example, the first zone Zone1 may include first to fourth subzones SubZone 1 to SubZone 4.

In an embodiment, one zone may be divided into a plurality of subzones SubZone, and the plurality of divided subzones may have different sizes. Specifically, the first subzone SubZone 1 and the second subzone SubZone 2 may be subzones corresponding to the size of one die. The third subzone SubZone 3 may be a subzone corresponding to the size of two dies. The fourth subzone SubZone 4 may be a subzone corresponding to the size of four dies.

One zone may store data for the same application program, and therefore, attributes of data stored in the one zone may be similar to each other. In addition, logical addresses included in the zone may be consecutive, and memory blocks corresponding to each zone in the storage device to which a zoned-namespace is applied may be sequentially programmed.

In an embodiment, memory blocks corresponding to each subzone may be sequentially programmed. Each subzone may be programmed in an order from an upper page group to a lower page group. For example, the first subzone SubZone1 may be programmed in an order from a fourth page group to a first page group. Pages of the same row order among pages included in each subzone may be grouped as a page group. For example, a fourth page page4 included in a first plane p11 of the first die Die1 and a fourth page page4 included in a second plane p12 of the first die Die1 may be grouped as one page group.

Figure 7:
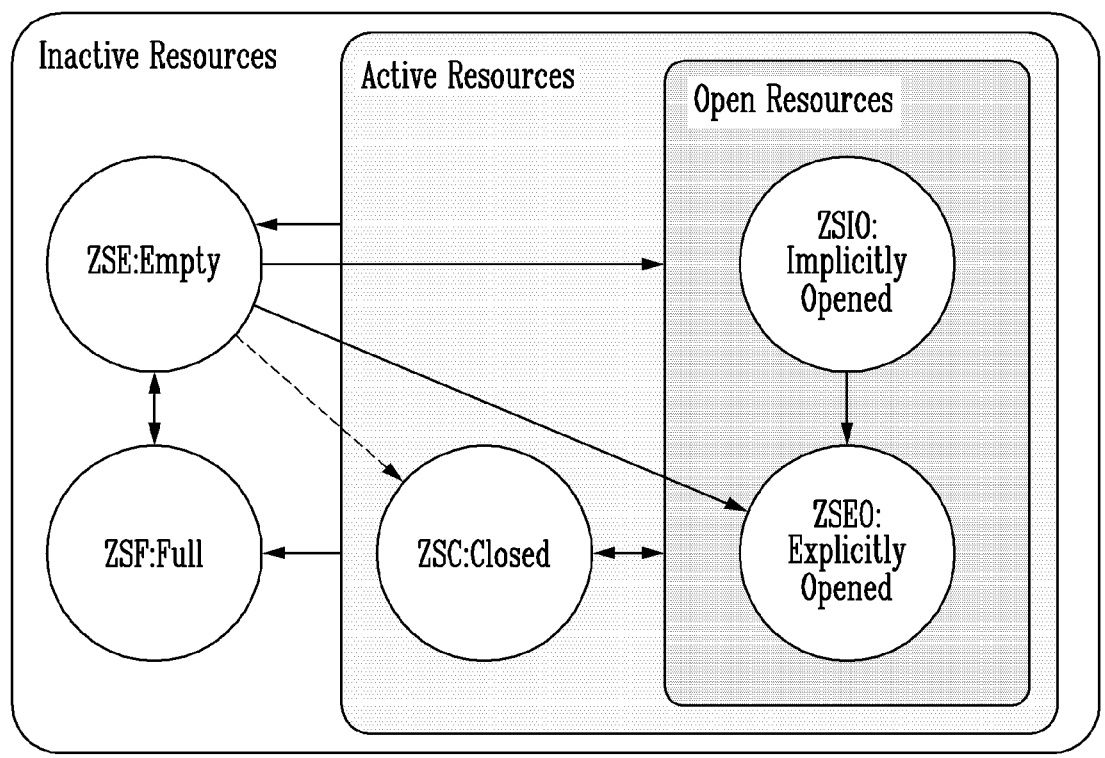
FIG. 7 is a diagram illustrating a state of a zone in accordance with an embodiment of the present disclosure.

FIG. 7 is a diagram illustrating a state of a zone in accordance with an embodiment of the present disclosure.

Referring to FIG. 7, zones may be generally divided into active zones and inactive zones. The active zones may include open zones and closed zones, and the inactive zones may include empty zones and full zones. The number of active zones including the open zones and the closed zones may be limited to the number of zones of the memory device.

The open zones may be divided into explicitly opened zones ZSEO and implicitly opened zones ZSIO. When the host explicitly provides the storage device with a command for allowing any one zone to be changed to an open zone, the open zone changed according to the command may an explicitly opened zone ZSEO. On the other hand, when the host does not explicitly provides any command but provides the storage device with only identification information on a program command and a zone, the storage device may autonomously change the zone to an open zone and perform a program operation. The open zone autonomously changed by the storage device may be an implicitly opened zone ZSIO. When a program command for another zone instead of an open zone is generated in a state in which all areas of a write buffer are allocated to open zones, the storage device may change, as a closed zone, any one open zone among the open zones. Meanwhile, when a program command for the closed zone changed due to the above-described reason is generated, the corresponding closed zone may be again changed to the open zone.

When data are all programmed in all pages of a memory block corresponding to the open zone, the storage device may change the open zone to a closed zone and then change the closed zone to a full zone. The full zone may mean a zone in which any empty area does not exist in a corresponding memory block. When the host provides the storage device with an erase command for a full zone or an active zone, the storage device may perform an erase operation on a memory block corresponding to the zone indicated by the erase command, and change the state of the zone to an empty zone. The empty zone may mean a zone in which a memory block corresponding to the corresponding zone is an empty memory block.

Figure 8:
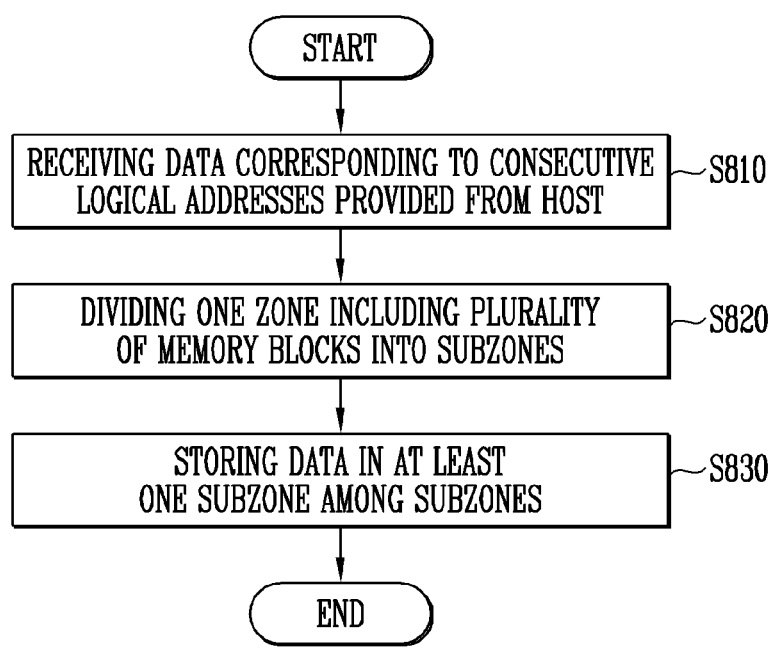
FIG. 8 is a flowchart illustrating an operating method of the storage device in accordance with an embodiment of the present disclosure.

FIG. 8 is a flowchart illustrating an operating method of the storage device in accordance with an embodiment of the present disclosure.

Referring to FIG. 8, an operating method of the storage device to which a zoned-namespace is applied is illustrated. Specifically, the storage device 1000 may receive data corresponding to consecutive logical addresses provided from the host (S810).

Also, the storage device 1000 may divide one zone including a plurality of memory blocks into subzones (S820). Specifically, the storage device 1000 may divide one zone including a plurality of memory blocks into subzones, based on one or more characteristics of the memory device and a size of the data. The one or more characteristics of the memory device may include at least one of a number of planes on which an interleaving operation can be performed, a number of channels included in the memory device, and a number of dies connected to the channel, etc.

In an embodiment, the storage device 1000 may determine a division method including a size of each of the subzones and a division number, based on the one or more characteristics of the memory device and the size of the data.

In an embodiment, the storage device 1000 may determine the size of each of the subzones to be n times (n is a positive integer) the size of a die.

In an embodiment, the storage device 1000 may divide at least one zone into subzones having different sizes.

Also, the storage device 1000 may store data in at least one subzone among the subzones (S830). Specifically, the storage device 1000 may perform an internal operation of the memory device 100 in a unit (a granularity) of at least one subzone. The internal operation may include at least one of a program operation, a read operation, an erase operation, and a background operation on a plurality of memory blocks, etc.

In an embodiment, when the storage device 1000 receives the same logical address as the logical address from the host 2000, the storage device 1000 may erase a subzone corresponding to the logical address, and store data corresponding to the same logical address in the erased subzone.

Figure 9:
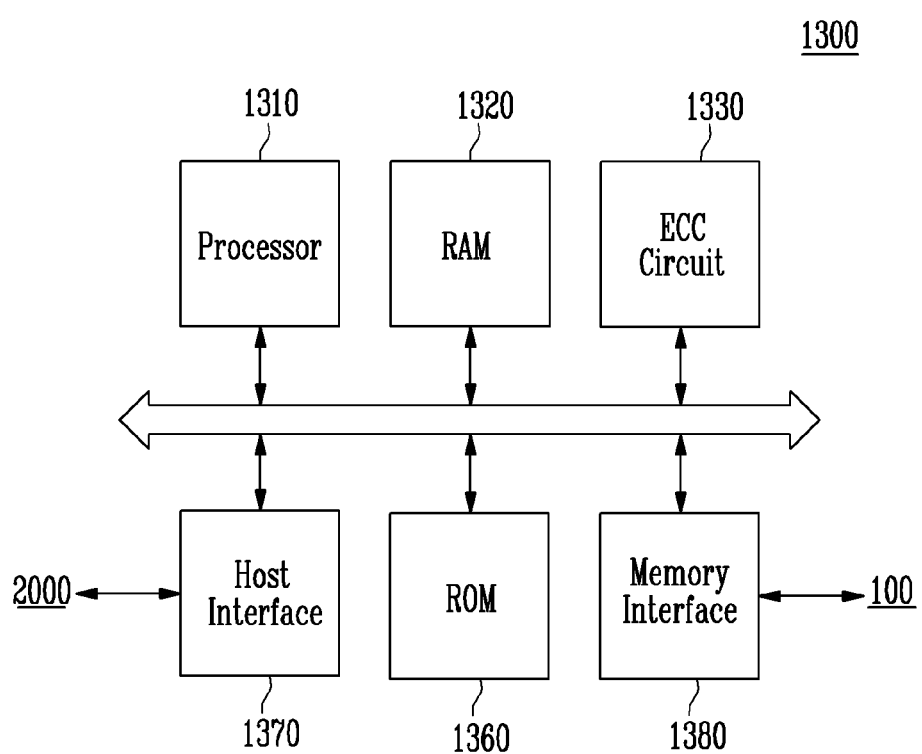
FIG. 9 is a diagram illustrating a memory controller in accordance with another embodiment of the present disclosure.

FIG. 9 is a diagram illustrating a memory controller in accordance with another embodiment of the present disclosure.

Referring to FIG. 9, the memory controller 1300 may include a processor 1310, a RAM 1320, and an ECC circuit 1330, a ROM 1360, a host interface 1370, and a memory interface 1380. The memory controller 1300 shown in FIG. 9 may be an embodiment of the memory controller 200 shown in FIG. 1.

The processor 1310 may communicate with the host 2000 by using the host interface 1370, and perform a logical operation to control an operation of the memory controller 1300. For example, the processor 1310 may load a program command, a data file, a data structure, etc., based on a request received from the host 2000 or an external device, and perform various operations or generate a command and an address. For example, the processor 1310 may generate various commands necessary for a program operation, a read operation, an erase operation, a suspend operation, and a parameter setting operation.

Also, the processor 1310 may perform a function of a Flash Translation Layer (FTL). The processor 250 may translate a Logical Block Address (LBA) provided by the host 2000 into a Physical Block Address (PBA) through the FTL. The FTL may receive an LBA input by using a mapping table, to translate the LBA into a PBA. Several address mapping methods of the FTL can be used according to mapping units. A representative address mapping method includes a page mapping method, a block mapping method, and a hybrid mapping method.

Also, the processor 1310 may generate a command without any request from the host 2000. For example, the processor 1310 may generate a command for background operations such as operations for wear leveling of the memory device 100 and operations for garbage collection of the memory device 100, etc.

The RAM 1320 may be used as a buffer memory, a working memory, or a cache memory of the processor 1310. Also, the RAM 1320 may store codes and commands, which the processor 1310 executes. The RAM 1320 may store data processed by the processor 1310. Also, the RAM 1320 may be implemented, including a Static RAM (SRAM) or a Dynamic RAM (DRAM).

The ECC circuit 1330 may detect an error in a program operation or a read operation, and correct the detected error. Specifically, the ECC circuit 1330 may perform an error correction operation according to an Error Correction Code (ECC). Also, the ECC circuit 1330 may perform ECC encoding, based on data to be written to the memory device 100. The data on which the ECC encoding is performed may be transferred to the memory device 100 through the memory interface 1380. Also, the ECC circuit 1330 may perform ECC decoding on data received from the memory device 100 through the memory interface 1380.

The ROM 1360 may be used as a storage unit for storing various information necessary for an operation of the memory controller 1300. Specifically, the ROM 1360 may include a map table, and physical-to-logical address information and logical-to-physical address information may be stored in the map table. Also, the ROM 1360 may be controlled by the processor 1310.

The host interface 1370 may implement a protocol for exchanging data between the host 2000 and the memory controller 1300. Specifically, the host interface 1370 may communicate with the host 2000 through at least one of various interface protocols such as a Universal Serial Bus (USB) protocol, a Multi-Media Card (MMC) protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer System Interface (SCSI) protocol, an Enhanced Small Disk Interface (ESDI) protocol, an Integrated Drive Electronics (IDE) protocol, or a private protocol, etc.

The memory interface 1380 may communicate with the memory device 100 by using a communication protocol under the control of the processor 1310. Specifically, the memory interface 1380 may communicate a command, an address, and data with the memory device 100 through a channel. For example, the memory interface 1380 may include a NAND interface.

Figure 10:
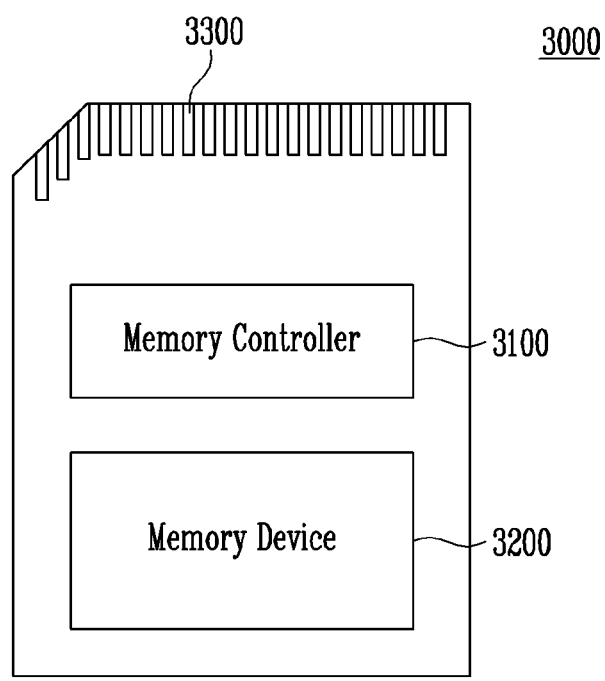
FIG. 10 is a diagram illustrating a memory card system in accordance with an embodiment of the present disclosure.

FIG. 10 is a diagram illustrating a memory card system in accordance with an embodiment of the present disclosure.

Referring to FIG. 10, the memory card system 3000 includes a memory controller 3100, a memory device 3200, and a connector 3300.

The memory controller 3100 may be connected to the memory device 3200. The memory controller 3100 may access the memory device 3200. For example, the memory controller 3100 may control read, write, erase, and background operations on the memory device 3200. The memory controller 3100 may provide an interface between the memory device 3200 and a host. Also, the memory controller 3100 may drive firmware for controlling the memory device 3200.

For example, the memory controller 3100 may include components such as a Random Access Memory (RAM), a processing unit, a host interface, a memory interface, and the error corrector 233.

The memory controller 3100 may communicate with an external device through the connector 3300. The memory controller 3100 may communicate with the external device (e.g., the host) according to a specific communication protocol. Exemplarily, the memory controller 3100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, or NVMe, etc.

Exemplarily, the memory device 3200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and/or a Spin Torque Transfer magnetic RAM (STT-MRAM), etc.

The memory controller 3100 and the memory device 3200 may be integrated into a single semiconductor device, to constitute a memory card. For example, the memory controller 3100 and the memory device 3200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), or a Universal Flash Storage (UFS), etc.

Figure 11:
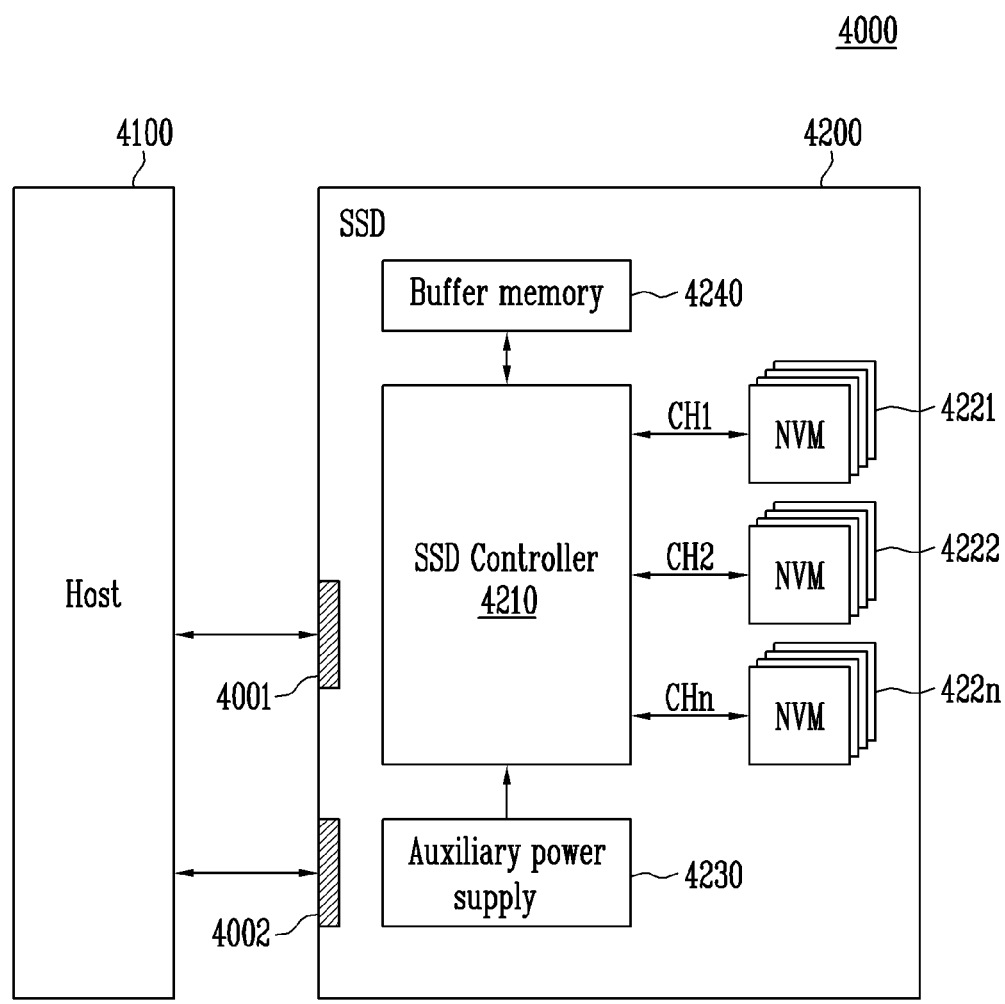
FIG. 11 is a diagram illustrating a Solid State Drive (SSD) in accordance with an embodiment of the present disclosure.

FIG. 11 is a diagram illustrating a Solid State Drive (SSD) in accordance with an embodiment of the present disclosure.

Referring to FIG. 11, the SSD system 4000 includes a host 4100 and an SSD 4200. The SSD 4200 exchanges a signal SIG with the host 4100 through a signal connector 4001, and receives power PWR through a power connector 4002. The SSD 4200 includes an SSD controller 4210, a plurality of flash memories 4221 to 422$n$, an auxiliary power supply 4230, and a buffer memory 4240.

In an embodiment, the SSD controller 4210 may serve as the memory controller 200 described with reference to FIG. 1. The SSD controller 4210 may control the plurality of flash memories 4221 to 422$n$ in response to a signal SIG received from the host 4100. Exemplarily, the signal SIG may be a signal based on an interface between the host 4100 and the SSD 4200. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, or an NVMe, etc.

The auxiliary power supply 4230 may be connected to the host 4100 through the power connector 4002. The auxiliary power supply 4230 may receive power PWR input from the host 4100 and charge the power PWR. When the supply of power from the host 4100 is not smooth, the auxiliary power supply 4230 may provide power of the SSD 4200. Exemplarily, the auxiliary power supply 4230 may be located in the SSD 4200, or be located at the outside of the SSD 4200. For example, the auxiliary power supply 4230 may be located on a main board, and provide auxiliary power to the SSD 4200.

The buffer memory 4240 may operate as a buffer memory of the SSD 4200. For example, the buffer memory 4240 may temporarily store data received from the host 4100 or data received from the plurality of flash memories 4221 to 422$n$, or temporarily store meta data (e.g., a mapping table) of the flash memories 4221 to 422$n$. The buffer memory 4240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 12:
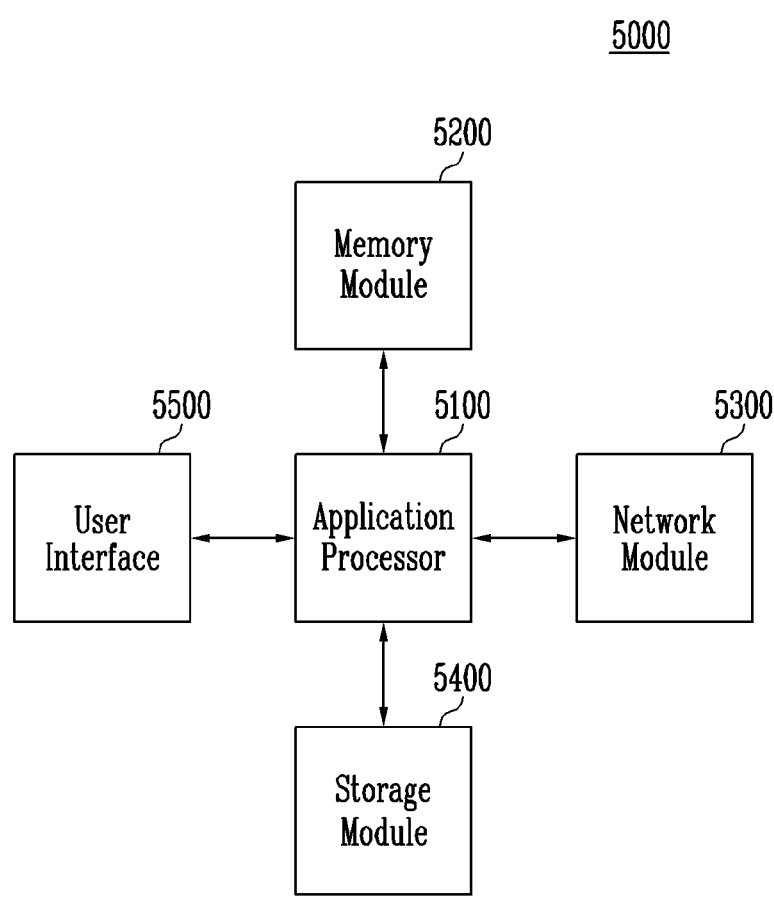
FIG. 12 is a diagram illustrating a user system in accordance with an embodiment of the present disclosure.

FIG. 12 is a diagram illustrating a user system in accordance with an embodiment of the present disclosure.

Referring to FIG. 12, the user system 5000 includes an application processor 5100, a memory module 5200, a network module 5300, a storage module 5400, and a user interface 5500.

The application processor 5100 may drive components included in the user system 5000, an operating system (OS), a user program, or the like. Exemplarily, the application processor 5100 may include controllers for controlling components included in the user system 5000, interfaces, a graphic engine, and the like. The application processor 5100 may be provided as a System-on-Chip (SoC).

The memory module 5200 may operate as a main memory, working memory, buffer memory or cache memory of the user system 5000. The memory module 5200 may include volatile random access memories such as a DRAM, an SDRAM, a DDR SDRAM, a DDR2 SDRM, a DDR3 SDRAM, an LPDDR SDRAM, an LPDDR2 SDRAM, and/or an LPDDR3 SDRAM; and/or nonvolatile random access memories such as a PRAM, a ReRAM, an MRAM, and/or a FRAM, etc. Exemplarily, the application processor 5100 and the memory module 5200 may be provided as one semiconductor package by being packaged based on a Package on Package (PoP).

The network module 5300 may communicate with external devices. Exemplarily, the network module 5300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and/or Wi-Fi. Exemplarily, the network module 5300 may be included in the application processor 5100.

The storage module 5400 may store data. For example, the storage module 5400 may store data received from the application processor 5100. Alternatively, the storage module 5400 may transmit data stored therein to the application processor 5100. Exemplarily, the storage module 5400 may be implemented with a nonvolatile semiconductor memory device such as a Phase-change RAM (PRAM), a Magnetic RAM (MRAM), a Resistive RAM (RRAM), a NAND flash, a NOR flash, and/or a NAND flash having a three-dimensional structure. Exemplarily, the storage module 5400 may be provided as a removable drive such as a memory card of the user system 5000 or an external drive.

Exemplarily, the storage module 5400 may include a plurality of nonvolatile memory devices, and the plurality of nonvolatile memory devices may operate identically to the memory device 100 described with reference to FIGS. 1 to 4. The storage module 4400 may operate identically to the storage device 1000 described with reference to FIG. 1.

The user interface 5500 may include interfaces for inputting data or commands to the application processor 5100 or outputting data to an external device. Exemplarily, the user interface 5500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there can be provided a storage device to which a zoned-namespace system for efficiently using a zone having a fixed size is applied, and an operating method of the storage device.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. Furthermore, one or more features from an embodiment can be combined with another embodiment, and/or one or more features can be omitted from an embodiment without departing from the scope of the disclosure. It should be apparent to those skilled in the art that various modifications can be made on the basis of the technological scope of the present disclosure in addition to the embodiments disclosed herein.

What is claimed is:

1. A storage device comprising:
a memory device including a plurality of memory blocks organized into a plurality of zones; and
a memory controller configured to perform a write operation on the plurality of zones,
wherein the memory controller is operable to:
divide at least one zone among the plurality of zones into subzones when the memory controller receives data corresponding to consecutive logical addresses provided from a host, wherein the at least one zone is divided based on a characteristic of the memory device and a size of the data; and
control the memory device to store the data in at least one subzone among the subzones,
wherein the subzones are units capable of operating internal operations independently from each other, and
wherein the memory controller is configured to control the memory device to:
erase a subzone corresponding to a logical address received from the host among the subzones; and
store data corresponding to the logical address in the erased subzone.

2. The storage device of claim 1, wherein the memory controller further includes a zone manager configured to divide the at least one zone into the subzones, based on the characteristic of the memory device and the size of the data.

3. The storage device of claim 2, wherein the zone manager is configured to determine a size of each of the subzones and a division number.

4. The storage device of claim 3, wherein the size of a subzone is n times a size of a die, n being a positive integer.

5. The storage device of claim 2, wherein the zone manager is configured to divide the at least one zone into the subzones having different sizes.

6. The storage device of claim 1, wherein the memory controller further includes an operation controller configured to control the memory device such that an internal operation of the memory device is performed in a unit of the at least one subzone.

7. The storage device of claim 6, wherein the internal operation includes at least one of a program operation, a read operation, an erase operation, or a background operation.

8. The storage device of claim 1, wherein the characteristic of the memory device includes at least one of a number of planes on which an interleaving operation is performed, a number of channels included in the memory device, or a number of dies connected to a channel.

9. The storage device of claim 1, wherein the plurality of zones have a same size.

10. A method for operating a storage device to which a zoned-namespace is applied, the method comprising:
   receiving data corresponding to consecutive logical addresses provided from a host;
   dividing at least one zone including a plurality of memory blocks into subzones, based on a characteristic of a memory device and a size of the data;
   erasing a subzone corresponding to a logical address received from the host among the subzones; and
   storing data corresponding to the logical address in the erased subzone,
   wherein the subzones are units capable of operating internal operations independently from each other.

11. The method of claim 10, wherein the dividing further includes determining a size of each of the subzones and a division number, based on the characteristic of the memory device and the size of the data.

12. The method of claim 11, wherein the size of a subzone is determined to be n times a size of a die, n being a positive integer.

13. The method of claim 10, wherein the at least one zone is divided into the subzones having different sizes.

14. The method of claim 10, further comprising performing an internal operation of the memory device in a unit of the at least one subzone.

15. The method of claim 14, wherein the internal operation includes at least one of a program operation, a read operation, an erase operation, and a background operation.

16. The method of claim 10, wherein the characteristic of the memory device includes at least one of a number of planes on which an interleaving operation is performed, a number of channels included in the memory device, or a number of dies connected to a channel.

\* \* \* \* \*